United States Patent
Huang et al.

(10) Patent No.: US 8,625,490 B2
(45) Date of Patent: Jan. 7, 2014

(54) MULTIPLE GRANULARITY LOCATION DETERMINATION

(75) Inventors: Ronald K. Huang, San Jose, CA (US); Morgan Grainger, Sunnyvale, CA (US); Jason Dere, San Jose, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 12/986,813

(22) Filed: Jan. 7, 2011

(65) Prior Publication Data

US 2012/0177025 A1 Jul. 12, 2012

(51) Int. Cl.
*H04W 4/00* (2009.01)

(52) U.S. Cl.
USPC .......................................................... 370/328

(58) Field of Classification Search
USPC .................. 370/310–349, 431–464
See application file for complete search history.

(56) References Cited

U.S. PATENT DOCUMENTS

| | | | |
|---|---|---|---|
| 5,508,708 A | 4/1996 | Ghosh et al. | |
| 6,445,927 B1 | 9/2002 | King et al. | |
| 7,127,257 B2 | 10/2006 | Riley et al. | |
| 7,133,909 B2 | 11/2006 | Bahl | |
| 7,778,593 B2 * | 8/2010 | Hsu et al. | 455/3.04 |
| 8,165,808 B2 * | 4/2012 | Scheibe | 701/533 |
| 2004/0104841 A1 | 6/2004 | Syrjarinne | |
| 2004/0259546 A1 * | 12/2004 | Balachandran et al. | 455/435.2 |
| 2005/0153692 A1 * | 7/2005 | Hwang et al. | 455/434 |
| 2006/0135180 A1 * | 6/2006 | Jakel et al. | 455/456.5 |
| 2008/0318594 A1 | 12/2008 | Monnerat | |
| 2009/0098873 A1 * | 4/2009 | Gogic | 455/436 |

FOREIGN PATENT DOCUMENTS

| | | | |
|---|---|---|---|
| EP | 0 777 399 A2 * | 6/1997 | |
| WO | 2010129094 | 11/2010 | |

OTHER PUBLICATIONS

Akbarov, et al., "Hybrid Pattern Matching/TDOA Positioning Method for CDMA Networks"., 4$^{th}$ Workshop on Positioning, Navigation and Communication, Mar. 1, 2007, pp. 199-203.
Notification of Transmittal of the International Search Report and the Written Opinion of the International Searching Authority, or the Declaration., International application No. PCT/U S2011/067652, mailed Mar. 12, 2012, 16 pages.

* cited by examiner

*Primary Examiner* — Kwang B Yao
*Assistant Examiner* — Juvena Loo
(74) *Attorney, Agent, or Firm* — Fish & Richardson P.C.

(57) ABSTRACT

A mobile device can store a set of first CDMA identifiers including, for example, system identifiers, network identifiers, or zone identifiers. Each first CDMA identifier can be associated with a first geographic location. The mobile device can determine a current location by matching a current first CDMA identifier with a stored first CDMA identifier. If a user desires a current location that has finer granularity, the mobile device can retrieve a set of second CDMA identifiers including, for example, base station identifiers. Each second CDMA identifiers can be associated with a second geographic location that has a finer granularity than that of the first geographic location. The mobile device can match a current second CDMA identifier from the retrieved second CDMA identifiers and designate the second geographic location associated with the matching second CDMA identifier as the current location that has the finer granularity.

27 Claims, 11 Drawing Sheets

MULTIPLE GRANULARITY LOCATION DETERMINATION

TECHNICAL FIELD

This disclosure relates generally to geographic location determination.

BACKGROUND

A code division multiple access (CDMA) communications system can include a radio network that includes multiple transceivers, also known as base transceiver stations (BTSs) or simply base stations. Each base station can be identified by a base station identifier, e.g., a base station identification (BSID) number. Each base station can serve a geographic area or a "cell." Cells of the CDMA communications network can be grouped into coverage areas. Each coverage area can be associated with a zone identifier. The coverage areas can be grouped into networks. Each network can be controlled by a centralized base station controller (CBSC). Each network can be associated with a network identifier, e.g., a network identification (NID) number. At a higher level, all base stations of a CDMA system can be associated with a system identifier, e.g., a system identification (SID) number that identifies the entire CDMA system. Each base station can serve multiple mobile devices (e.g., cellular phones). If a mobile device is served by a base station, the mobile device "knows" the base station identifier of the base station, the zone identifier, the NID, and the SID.

SUMMARY

Methods, program products, and systems for multiple granularity location determination are described. A mobile device can store a set of first CDMA identifiers including, for example, system identifiers, network identifiers, or zone identifiers. Each first CDMA identifier can be associated with a first geographic location. The mobile device can determine a current location by matching a current first CDMA identifier with a stored first CDMA identifier and designating the first geographic location associated with the matching first CDMA identifier as the current location. If a user desires a current location that has finer granularity, the mobile device can retrieve a set of second CDMA identifiers including, for example, base station identifiers. Each second CDMA identifiers can be associated with a second geographic location that has a finer granularity than that of the first geographic location. The mobile device can match a current second CDMA identifier from the retrieved second CDMA identifiers and designate the second geographic location associated with the matching second geographic identifier as the current location that has the finer granularity.

In some implementations, a server computer can receive location information from location-aware mobile devices (e.g., GPS-enabled devices) located in an area covered by a CDMA system. The server computer can also receive from the mobile device CDMA identifiers (e.g., SIDs, NIDs, zone identifiers, or BSIDs). The server computer can estimate a geographic location using the received information. The server computer can associate the geographic location with the CDMA identifiers. The server computer can provide, in a tiered manner, the geographic location associated with the CDMA identifiers to second mobile devices for estimating current locations of the second mobile devices.

Techniques of multiple granularity location determination can be implemented to achieve the following advantages. A location can be estimated for and associated with a CDMA identifier when the actual geography of the coverage area associated with the CDMA identifier is unknown. The location can be used to estimate a current location of a mobile device served by the CDMA system when other information (e.g., a GPS signal) is unavailable.

The location being associated with CDMA identifiers can have multiple granularities, corresponding to a multi-tiered structure of the CDMA system. A mobile device that can receive CDMA identifier updates from a server. The mobile device does not need to perform a finer-grained location determination unless the mobile device has already determined that, given a coarse-grained location, the finer-grained location determination is warranted. For example, the mobile device need not download or store a list of base station identifiers of base stations located in San Francisco Bay Area, and locations associated with the base station identifiers, when a current system identifier indicates that the mobile device is connected to a CDMA system located in New York.

Using multiple granularity location determination techniques, a mobile device can quickly determine a coarse estimate of a current geographic location of the mobile device. The determination calculation can include a simple memory lookup, based on the current CDMA identifier, and therefore can be resource efficient. The mobile device can improve the coarse estimate upon request.

For GPS-enabled mobile devices, multiple granularity location determination techniques can be advantageous when, for example, GPS signals are weak (e.g., inside buildings). In addition, in a GPS-enabled mobile device, the geographic area associated with a CDMA identifier can be used to provide an almost instantaneous location estimate of the mobile device.

A coarse location estimate can be improved on an as-needed basis. If a user of the mobile device requires more accurate location than the coarse location associated with a CDMA system, the mobile device can determine a current location based on a network identifier, a zone identifier, a base station identifier, or available wireless (e.g., WiFi™, WiMax™, or Bluetooth™) connections, even if the mobile device is not equipped with GPS features or when GPS signals are weak.

The details of one or more implementations of multiple granularity location determination are set forth in the accompanying drawings and the description below. Other features, aspects, and advantages of multiple granularity location determination will become apparent from the description, the drawings, and the claims.

BRIEF DESCRIPTION OF THE DRAWINGS

Like reference symbols in the various drawings indicate like elements.

DETAILED DESCRIPTION

Overview of Multiple Granularity Location Determination

Figure 1:
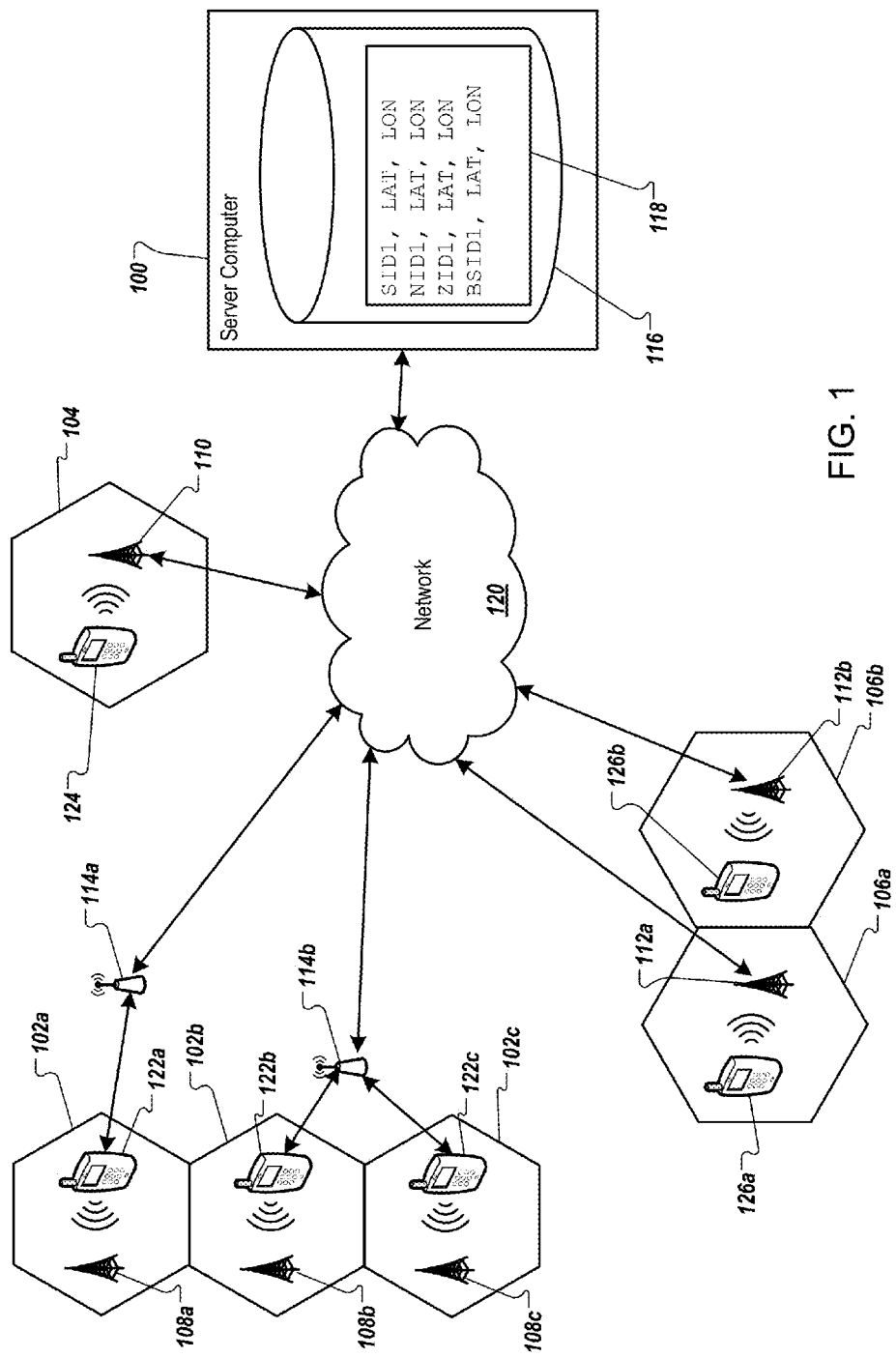
FIG. 1 is an overview of techniques of multiple granularity location determination.

FIG. 1 is an overview of techniques of multiple granularity location determination. Server computer 100 can be connected to network 120. Network 120 can be a data communications network (e.g., a packet switching network) or a hybrid of data and voice network. Through network 120, server computer 100 can communicate with various devices that are connected to network 120, including mobile devices 122a-c, 124, and 126a-b.

Mobile devices 122a-c, 124, and 126a-b can be location-aware mobile devices that can be connected to one or more CDMA systems. The CDMA systems can each cover one or more geographic areas. Server computer 100 can estimate geographic coordinates and a size to be associated with each geographic area using locations of mobile devices 122a-c, 124, and 126a-b. The locations of mobile devices 122a-c, 124, and 126a-b can be estimated using various technologies implemented on mobile devices 122a-c, 124, and 126a-b. For example, mobile device 122a can determine a location of mobile device 122a using Global Positioning System (GPS) signals received though a GPS receiver that is built in or coupled to mobile device 122a.

Each of mobile devices 122a-c, 124, and 126a-b can be served by a base station of the CDMA systems. For example, mobile devices 122a-c can be served by base stations 108a-c, respectively; mobile device 124 can be served by base station 110; and mobile devices 126a and 126b can be served by base stations 112a and 112b, respectively. In some implementations, a CBSC can determine which mobile device can be served by which base station based on channel availability.

Each CDMA service provider can define a cellular structure specific to the service provider, including grouping cells. In the example shown, each of base stations 108a-c, 110, and 112a-b can belong to a same CDMA system and be associated with a same system identifier. Base stations 108a-c and 110 can be associated with a first network identifier. Base stations 112a-b can be associated with a second network identifier. Base stations 108a-c can be associated with a first zone identifier. Base station 110 can be associated with a second zone identifier. Base stations 112a-b can be associated with a third zone identifier.

A mobile device (e.g., mobile device 122a) located within a cell (e.g., cell 102a) can acquire current CDMA identifiers of mobile device 122a. The current CDMA identifiers can include a base station identifier of base station 108a, the first zone identifier, the first network identifier, and the system identifier. Mobile device 122a can transmit the current CDMA identifiers and the current location of mobile device 122a to server computer 100 through network 120. The transmission can occur at a certain time (e.g., when a user finishes a phone conversation and "hangs up" mobile device 122a, or when the user terminates a data communication session).

In some implementations, the transmission from mobile devices 122a-c, 124, and 126a-b to server computer 100 can be through the base stations. In some implementations, the transmissions from mobile devices 122a-c to server computer 100 can occur through wireless access points 114a and 114b of a wireless communications network, which can be distinct from the CDMA systems. An exemplary wireless communications network can be a Wireless Local Area Network (WLAN). For example, mobile devices 122a-c can store locations associated with current CDMA identifiers in a cache memory device, and transmit the stored locations and CDMA identifiers to server computer 100 when wireless access points 114a or 114b become available to mobile devices 122a-c.

Upon receiving the information (including CDMA identifiers and location coordinates) from mobile devices 122a-c, 124, and 126a-b, server computer 100 can store the information in a temporary database. After a time period (e.g., a day, or a week) where a statistically significant amount of data has been received, server computer 100 can select from the temporary database CDMA identifiers that are associated with a number of locations that exceeds a threshold. The selected CDMA identifiers can be used in further computation.

For each selected CDMA identifier, server computer 100 can calculate an estimated geographic area to be associated with the CDMA identifier based on the locations received from mobile devices 122a-c, 124, and 126a-b. In this specification, the term "CDMA location" will be used to refer to the estimated geographic area to be associated with a CDMA identifier. The CDMA location can have various granularities. For example, in some implementations, a CDMA location associated with a system identifier can have a coarse granularity; a CDMA location associated with a network identifier can have a finer granularity; a CDMA location associated with a zone identifier can have a yet finer granularity; a CDMA location associated with a base station identifier can have a finest granularity. To determine a location of a mobile device at granularity finer than that of CDMA location associated with a base station identifier, the mobile device can use triangulation or GPS. Each CDMA location can be represented as a circle, whose center can be defined by a latitude and a longitude, and whose radius can correspond to a radius. The radius can represent a probability that a certain percentage of mobile devices (e.g., 95 percent) are located within the radius. The CDMA location associated with a particular CDMA identifier does not necessarily match the geographic shape or location of the area corresponding to the particular CDMA identifier as defined by the CDMA service provider. The CDMA identifiers and corresponding CDMA locations can be stored as location records 118 in CDMA location database 116.

For example, location records 118 can include four exemplary CDMA identifiers. "SID1" can be a system identifier for all cells base stations in a CDMA system (cells 102a-c, 104, and 106a-b). "NID1" can be a network identifier for a portion of the CDMA system (cells 102a-c and cell 104). "ZID1" can be a zone identifier for a base station group (including cells 102a-c). "BSID1" can be a base station identifier of a base station (e.g., base station 108b). Each of the CDMA identifiers can be associated with a latitude, a longitude, and an uncertainty radius. The latitudes, longitudes, and uncertainty radii can be included in records 118.

Server computer 100 can send, in a tiered manner, records 118 to mobile device 126b for determining a location of mobile device 126*b*. In some implementations, records 118 can be sent to mobile device 126*b* in portions. For example, server computer 100 can send system identifier "SID1" to mobile device 126*b* upon an initialization of mobile device 126*b*. Server computer 100 can send the network identifier "NID1" upon determining that mobile device 126*b* is within the coverage area of the CDMA system represented by "SID1." Likewise, server computer 100 can send the zone identifier "ZID1" upon determining that mobile device 126*b* is within the cells represented by "NID1." When server computer 100 determines that mobile device 126*b* is within the cells represented by "ZID1," server computer 100 can send "BSID1" to mobile device 126*b*.

Exemplary Multiple Granularity Location Determination

Figure 2:
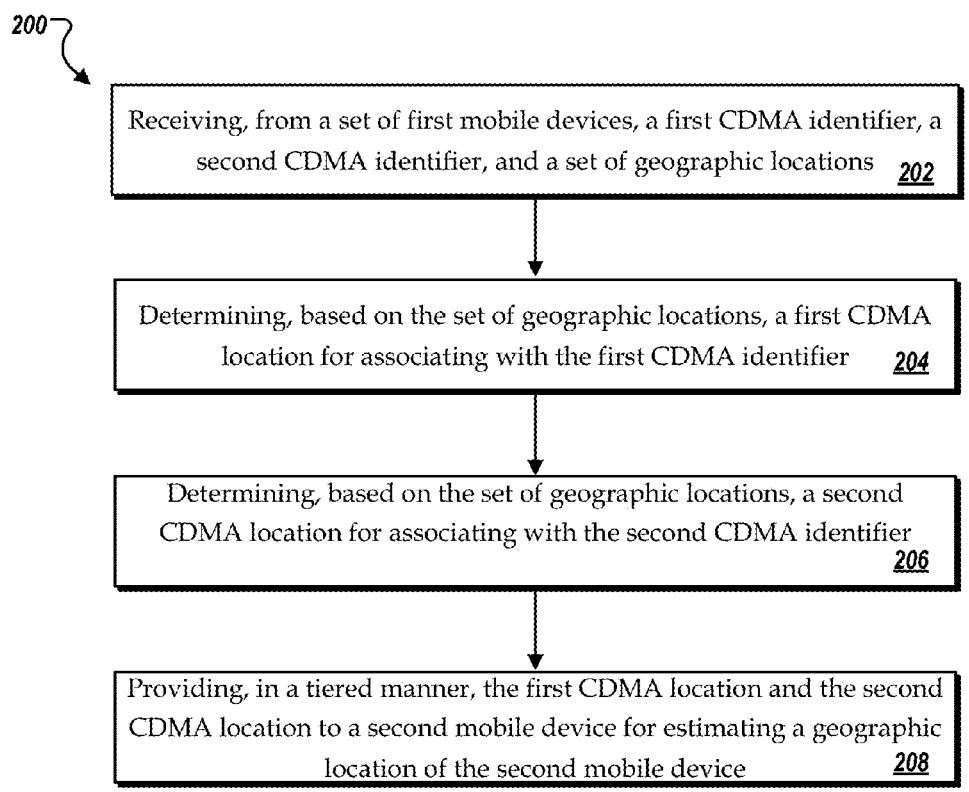
FIG. 2 is a flowchart illustrating an exemplary process of multiple granularity location determination.

FIG. 2 is a flowchart illustrating exemplary process 200 of multiple granularity location determination. A computer can receive (202), from a set of first mobile devices, a first CDMA identifier of a CDMA system, a second CDMA identifier of the CDMA system, and a set of geographic locations of the set of first mobile devices. The first CDMA identifier and second CDMA identifier each can include at least one of a system identifier, a network identifier, a zone identifier, or a base station identifier. The first CDMA identifier (e.g., a system identifier, network identifier, or zone identifier) can identify at least portion of the CDMA system. The second CDMA identifier (e.g., a network identifier, zone identifier or base station identifier) can identify a subset of the portion of the CDMA system.

The computer can determine (204), based on the set of geographic locations, a first CDMA location for associating with the first CDMA identifier. The first CDMA location can be a coarse location.

The computer can determine (206), based on the set of geographic locations, a second CDMA location for associating with the second CDMA identifier. The second CDMA location can be inside the first CDMA location and have finer granularity than that of the first CDMA location. The first CDMA location and second CDMA location each can include geographic coordinates (e.g., latitudes, longitudes, and latitudes) and an indicator of an error margin. Operations of determining the first and second CDMA location will be described in further detail below in reference to FIG. 3B.

The computer can provide (208), in a tiered manner, the first CDMA location and the second CDMA location to a second mobile device for estimating a geographic location of the second mobile device using the first CDMA identifier and the second CDMA identifier. Providing the first CDMA location and the second CDMA location to the second mobile device can include providing the first CDMA location to the second mobile device in association with the first CDMA identifier. The computer can receive a confirmation that the second mobile device is located at the first CDMA location. The computer can then provide the second CDMA location to the second mobile device in association with the second CDMA identifier.

Figure 3:
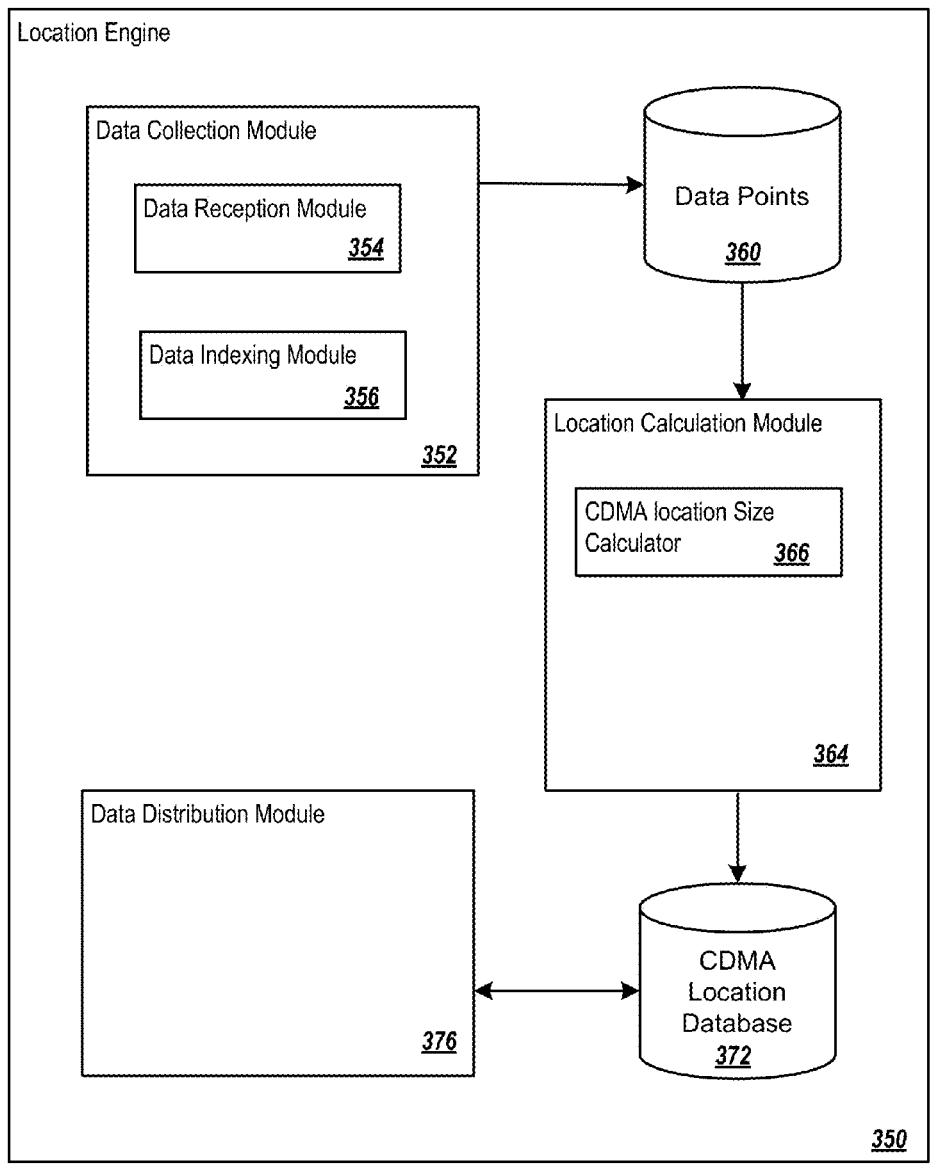
FIG. 3 is a block diagram illustrating an exemplary system implementing techniques of multiple granularity location determination.

FIG. 3 is a block diagram illustrating an exemplary system implementing techniques of multiple granularity location determination. The system can include one or more processors, one or more memory devices storing instructions, and other hardware or software components. The system can include location engine 350 that can be used to determine a CDMA location to be associated with a CDMA identifier.

Location engine 350 can include data collection module 352 that can receive data from various mobile devices through various access points or base stations. The data can include multiple data points that can indicate locations of one or more location-aware mobile devices as well as current CDMA identifiers of the mobile devices. In some implementations, the data points can also include information on which time zone the mobile devices are located. Data collection module 352 can include data reception module 354, which can receive data transmitted from the mobile devices, and data indexing module 356. Data indexing module 356 can perform various processing on the received data points. For example, data indexing module 356 can sort latitudes, longitudes, and altitudes based on base station identifiers. Data indexing module 356 can also group data into sets based on time periods. For example, a new set of received locations can be created for a configurable period of time (e.g., six hours).

Sets of received locations of the mobile devices, as well as associating CDMA identifiers, can be stored in data point database 360. Data point database 360 can store current and historical locations of various mobile devices. Data point database 360 can include an ad hoc database, relational database, object-oriented database. Data point database 360 can be hosted locally or remotely in relation to location engine 350.

Location calculation module 364 can be utilized to calculate an average geographic location in sets of data points in data points database, calculate distances between the average geographic location and locations of various data points, and exclude locations from the sets for further computation. Location calculation module 364 can perform the calculations for a particular set (e.g., a set of data points associated with a base station identifier) until an exit condition is reached for the particular set. Location calculation module 364 can determine CDMA locations for each CDMA identifier.

In some implementations, location calculation module 364 can calculate the sizes of a CDMA location using CDMA location size calculator 366. A CDMA location can be defined by a center having the average latitude, longitude, and altitude coordinates of the set of locations. The CDMA location can be further defined by a radius determined based on distances from locations in the set of locations to the center. The latitude, longitude, and altitude coordinates of centers for the CDMA location locations and the radii of the CDMA location locations can be stored in CDMA location database 372. CDMA location database 372 can be updated periodically by location calculation module 364.

The data of CDMA location database 372 can be distributed to mobile devices using data distribution module 376. Data distribution module 376 can send information of CDMA location locations (e.g., center coordinates and radii) that are associated with CDMA identifiers to mobile devices (e.g., non-GPS-enabled mobile device) upon request, through broadcasting, or using various push technology without receiving requests from the mobile devices.

Multiple Granularity Location Determination on Mobile Devices

Figure 4A:
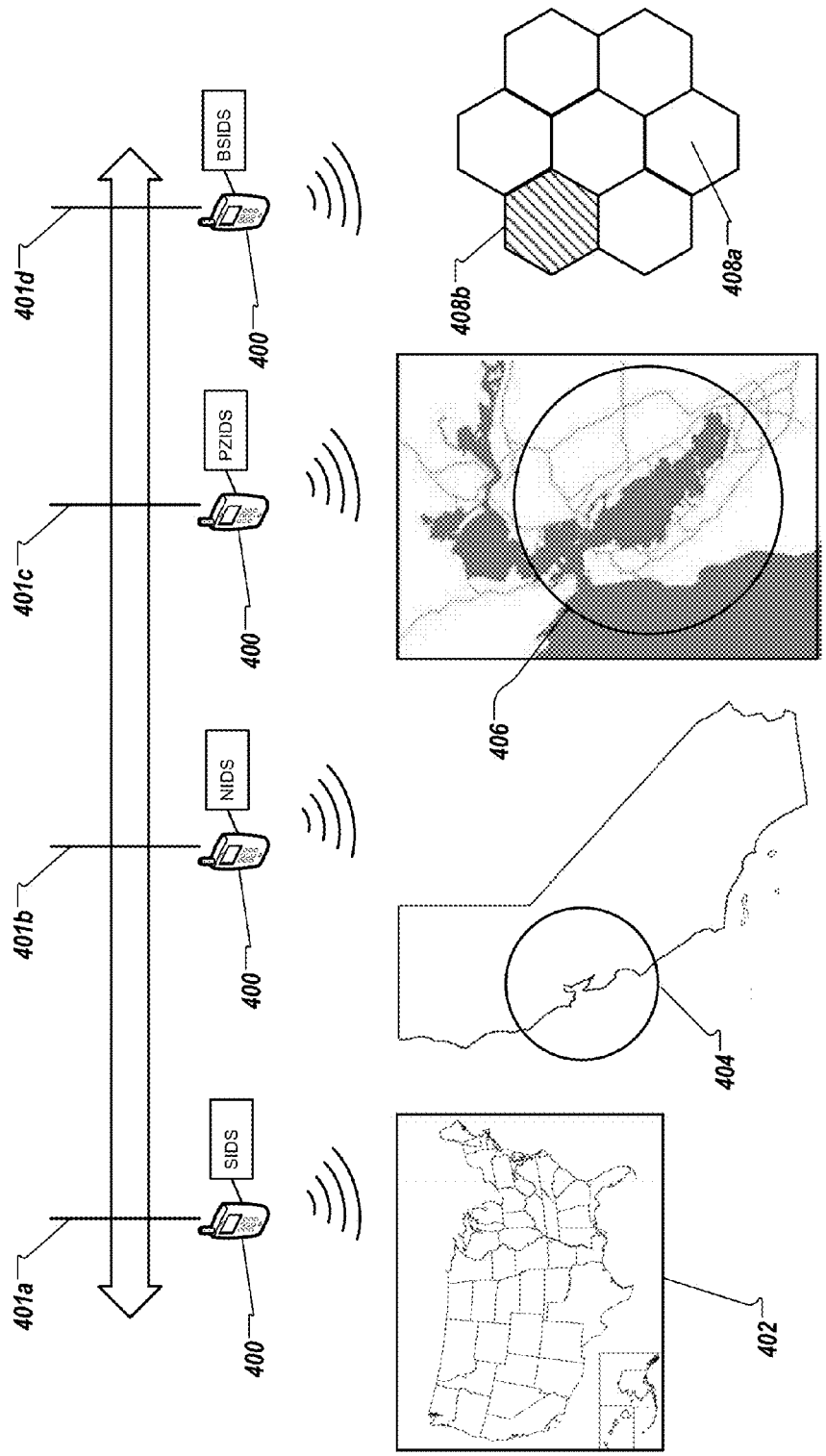
FIG. 4A is an overview of techniques of multiple granularity location determination implemented on mobile devices.

FIG. 4A is an overview of techniques of multiple granularity location determination implemented on mobile devices. Mobile device 400 can be a mobile device that can connect to a CDMA communications network. As an illustration, initially, mobile device 400 is unaware of a current location. In response to a user inquiry of location, mobile device 400 can provide for display in a graphical user interface a default location indicator corresponding to country 402.

At stage 401b, mobile device 400 can detect CDMA signals and connect to a base station of a CDMA system. Mobile device 400 can receive from the base station current CDMA identifiers including a system identifier, a network identifier, a zone identifier, and a base station identifier. Mobile device 400 can perform a lookup in a set of stored system identifiers using the current system identifier. The stored system identifiers can be stored on mobile device 400 or retrieved from a server. Each stored system identifier can be stored in association with a coarse CDMA location. In some implementations, the system identifiers can be stored on mobile device 400 when mobile device 400 was manufactured or shipped, and can be added to or updated as a part of the software update process for mobile device 400.

If the current system identifier is not in the set of stored system identifiers, mobile device 400 can continue using the default location indicator corresponding to country 402 in response to a user query for location. If the current system identifier is in the set of stored system identifiers, in stage 401c, mobile device 400 can zoom into the coarse CDMA location. In response to a user inquiry of location, mobile device 400 can provide for display in a graphical user interface a location indicator corresponding to coarse CDMA location 404. Coarse CDMA location 404 can correspond to the current system identifier In addition, mobile device 400 can retrieve one or more network identifiers from a storage device on mobile device 400 or from a server computer. The network identifiers can be network identifiers of the CDMA system identified by the system identifier. Each retrieved network identifier can be stored in association with a CDMA location that has a finer granularity than that associated with a system identifier. Mobile device 400 can perform a look up into the retrieved network identifiers using the current network identifier. In some implementations, the network identifiers can be stored on mobile device 400 when mobile device 400 was manufactured or shipped.

If the current network identifier is not in the set of retrieved network identifiers, mobile device 400 can continue using the location indicator corresponding to coarse CDMA location 404 in response to a user query. If the current network identifier is in the set of retrieved network identifiers, mobile device 400 can zoom into the finer-grained CDMA location. In response to a user inquiry of location, mobile device 400 can provide for display in a graphical user interface a location indicator corresponding to the finer-grained CDMA location 406.

Similarly, at stage 401d, mobile device 400 can retrieve one or more zone identifiers corresponding to the current network identifier, and provide for display a current location indicator indicating a location corresponding to the zone identifier. The location can correspond to multiple cells 408a. Mobile device 400 can then retrieve base station identifiers that correspond to the current zone identifier, and identify a current location that corresponds to CDMA location 408b associated with the current base station identifier. Mobile device 400 can further improve the granularity of a current location using wireless access points. Operations of improving the granularity of a current location using wireless access points will be described in more details below in reference to FIG. 4B. At each of stages 401a-d, if a finer CDMA location cannot be determined, mobile device 400 can fall back to a coarser CDMA location in a previous stage.

In some implementations, mobile device 400 can request the zone identifiers and base station identifiers from a server upon a user request to provide fine granularity locations. Mobile device 400 can display a prompt, indicating to the user that a data request will be sent.

Figure 4B:
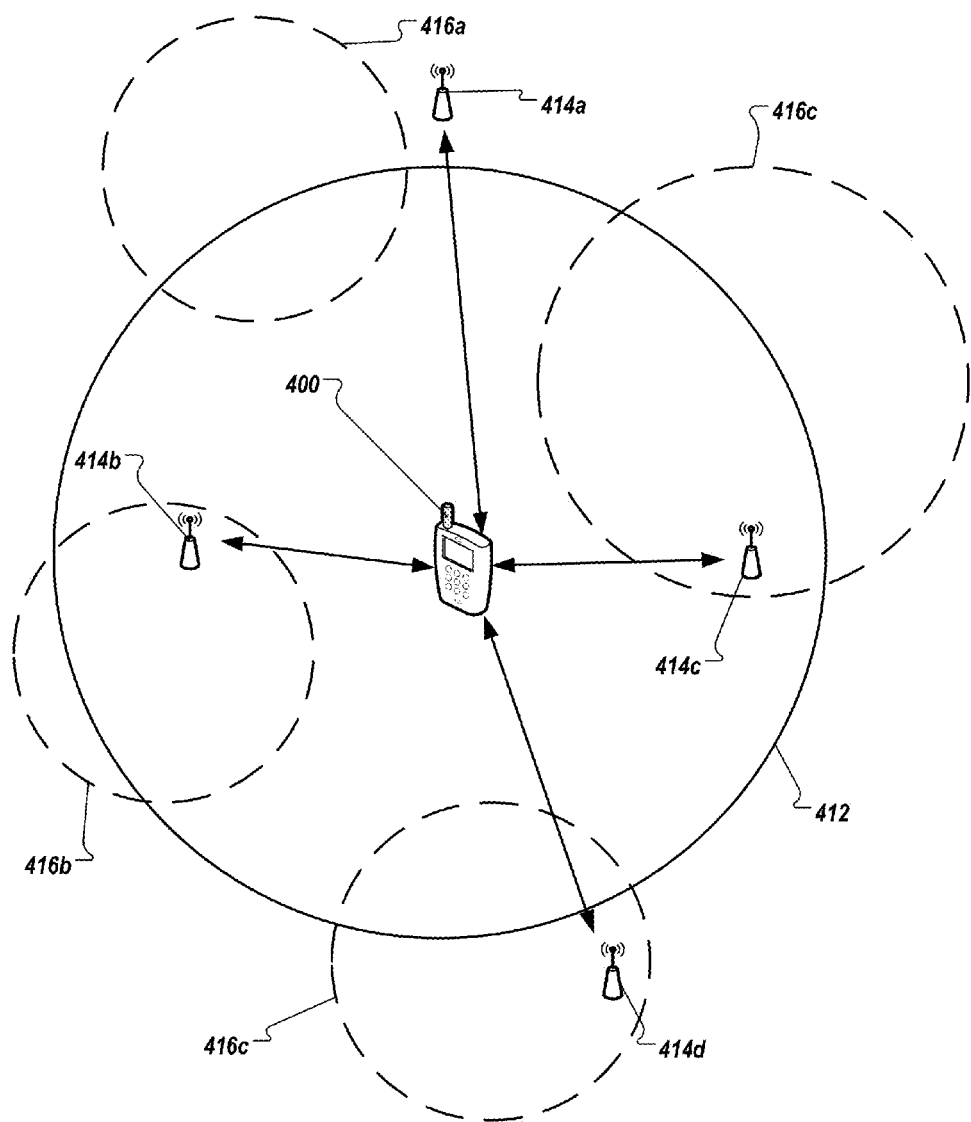
FIG. 4B illustrates techniques of improving accuracy of a location associated with a CDMA identifier using locations of wireless access points.

FIG. 4B illustrates techniques of improving accuracy of a location associated with a CDMA identifier using locations of wireless access points. Mobile device 400 can be an exemplary mobile device that can use locations of wireless access points to determine its location. An exemplary section of a communication network that includes access points 414a-d is illustrated. Mobile device 400 can be associated with a current base station identifier of a CDMA system, and can identify a current location based on the current base station identifier.

Mobile device 400 can be wirelessly connected to access point 414a. Access point 414a can be an access point of a WLAN (e.g., a WiFi™, WiMax™, or Bluetooth™ network). From access point 414a, mobile device 400 can receive data that include locations of neighboring access points. Mobile device 400 can store the received data on a storage device. The stored data can be updated periodically.

In the example shown, mobile device 400 is connected to access point 414a. In addition, mobile device 400 is located within communication ranges to access points 414b, 414c, and 414d. Mobile device 400 can identify access points 414a, 414b, 414c, and 414d under wireless communication protocols used in the WLAN (e.g., IEEE 802.11a). Access points 414a, 414b, 414c, and 414d can be identified by media access control (MAC) addresses of the access points or other identifiers (e.g., Bluetooth™ identifiers).

Mobile device 400 can identify presence areas 416a, 416b, 416c, and 416d that are associated with access points 414a-d, respectively. A "presence area" (e.g., presence area 416a) can be an estimated area that is associated with an access point (e.g., access point 414a) in which mobile devices connected to access point 414a is likely to be located. Identifying presence areas 416a-d can include retrieving information on the presence areas 416a-d from a memory device coupled to mobile device 400. In some implementations, mobile device 400 can request from a server the presence areas 416a-d by sending to the server identifiers of access points 414a-d.

Based on presence areas 416a-d, mobile device 400 can execute an iterative process (e.g., a multi-pass analysis) on the presence areas 416a-d. The iterative process can produce geographic area 412, which can be an estimate of the current geographic location of mobile device 400. Geographic area 412 can be a geographic space when three-dimensional location information is utilized. Mobile device 400 can display the estimated current location on a display device (e.g., on a map display). The estimated current location can be a location that can improve upon the CDMA location determined by a base station identifier.

Figure 4C:
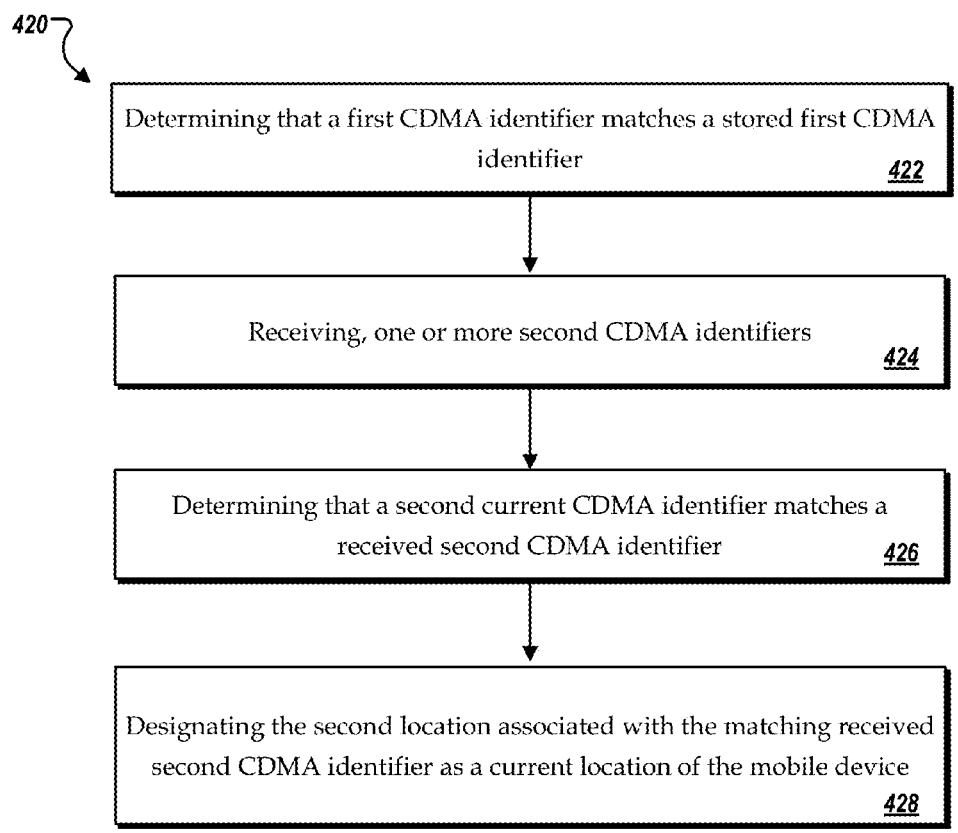
FIGS. 4C and 4D are flowchart illustrating an exemplary process of multiple granularity location determination, executed on a mobile device.

FIG. 4C is a flowchart illustrating exemplary process 420 of multiple granularity location determination, executed on mobile device 400. Mobile device 400 can determine (422) that a first CDMA identifier matches a stored first CDMA identifier. The stored first CDMA identifier can correspond to at least a portion of a CDMA system and be associated with a first location. The first CDMA identifier can include a system identifier, a network identifier, or a zone identifier.

Mobile device 400 can receive (424), from a server or from a storage device coupled to mobile device 400, one or more second CDMA identifiers. Each second CDMA identifier can be associated with a second location. Each second CDMA identifier can correspond to a subset of the portion of the CDMA system. The one or more second CDMA identifiers can include one or more base station identifiers. Mobile device 400 can designate the first location as the current location of mobile device 400 before determining that the second current CDMA identifier matches a received second CDMA identifier. Mobile device 400 can provide a first indicator for display. The first indicator can indicate the first location. Upon determining that the second current CDMA identifier matches the received second CDMA identifier, mobile device 400 can provide a second indicator for display. The second indicator can indicate the second location Mobile device 400 can determine (426) that a second current CDMA identifier matches a received second CDMA identifier. Mobile device 400 can designate (428) the second location associated with the matching received second CDMA identifier as a current location of mobile device 400.

In some implementations, mobile device 400 can detect a change of the first current CDMA identifier. For example, when mobile device 400 moves from a first CDMA system to a second CDMA system, the system identifier can change. Upon detecting the change, mobile device 400 can request, from a server, the one or more second CDMA identifiers.

Figure 4D:
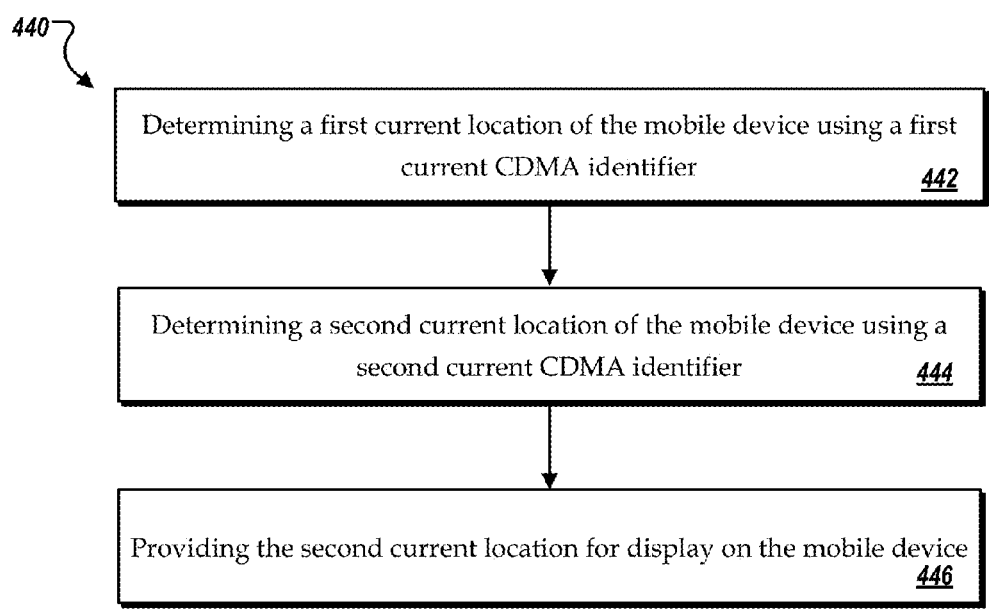

FIG. 4D is a flowchart illustrating exemplary process 440 of multiple granularity location determination, executed on mobile device 400. Mobile device 400 can determine (442) a first current location of mobile device 400 using a first current CDMA identifier. The first current CDMA identifier can be associated with at least a portion of a CDMA system. The first current CDMA identifier can include at least one of a system identifier, a network identifier, or a zone identifier. The first current CDMA identifier can correspond to a first location. The first location can have a first granularity. Determining the first current location can include receiving the first current CDMA identifier from the CDMA system. Mobile device 400 can identify a stored first CDMA identifier that matches the first current CDMA identifier. The stored first CDMA identifier can be associated with a first location. Mobile device 400 can designate the first location associated with the stored first CDMA identifier as the first current location of mobile device 400.

In response to a request to determine a current location at a location granularity finer than the first granularity, mobile device 400 can determine (444) a second current location of mobile device 400 using a second current CDMA identifier. The second current CDMA identifier can include at least one of a network identifier, a zone identifier, or a base station identifier. The second current CDMA identifier can correspond to a second location. The second location can have a second granularity that is finer than the first granularity. The second CDMA identifier can be associated with a subset of the portion of the CDMA system represented by the first CDMA identifier. Determining the second current location can include receiving the second current CDMA identifier from the CDMA system. Mobile device 400 can request at and receive from a server a set of one or more second CDMA identifiers. Each received second CDMA identifier can be associated with a second location. Mobile device 400 can identify a received second CDMA identifier that matches the second current CDMA identifier. Mobile device 400 can designate the second location associated with the matching second CDMA identifier as the second current location of the mobile device 400.

Mobile device 400 can provide (446) the second current location for display on mobile device 400. In some implementations, before providing the second current location for display, mobile device 400 can provide the first current location for display on mobile device 400. Providing the second current location for display can include providing for display an animation effect. The animation effect can zoom from the first current location to the second current location.

Exemplary User Interface of Multiple Granularity Location Determination

Figure 5:
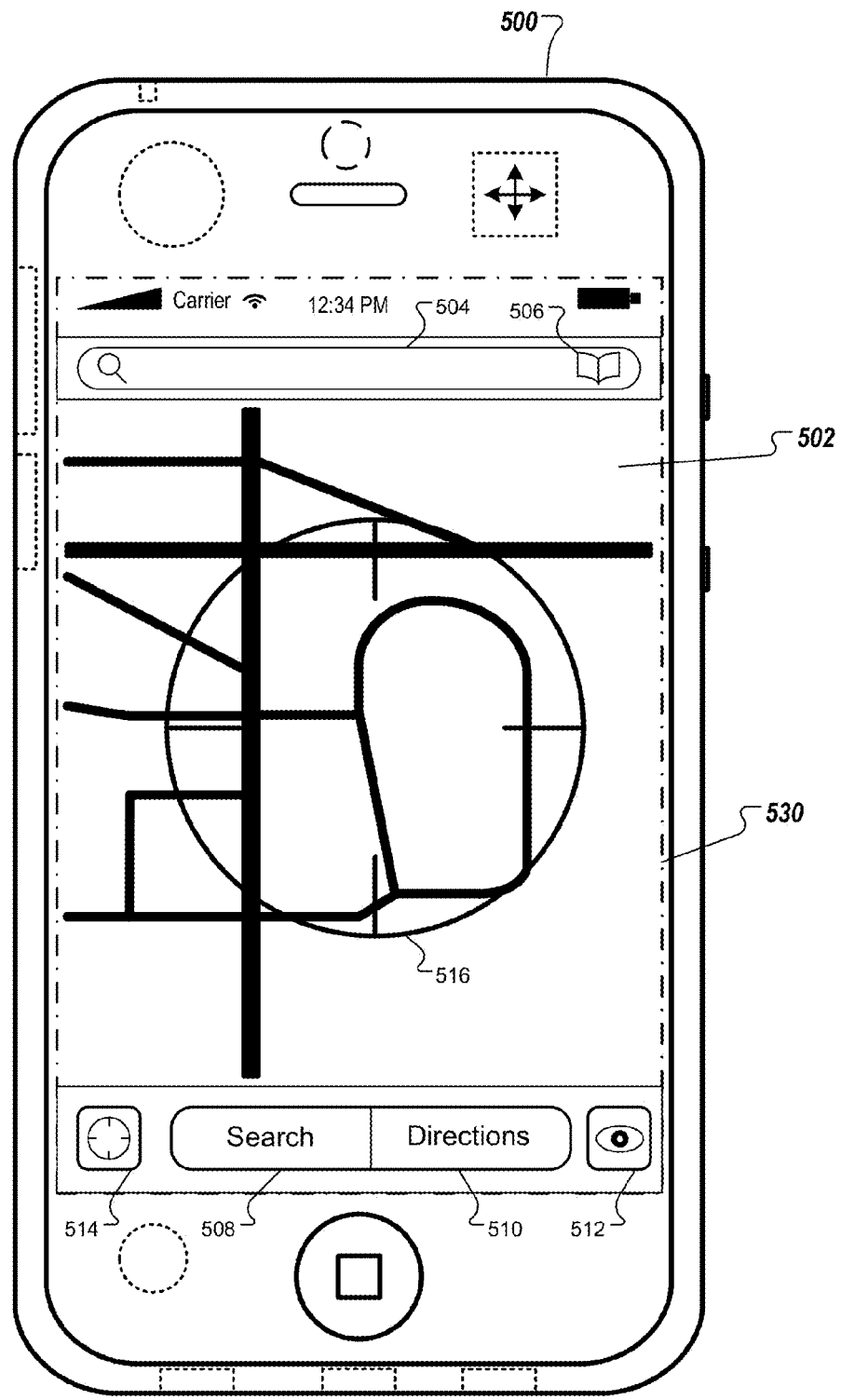
FIG. 5 illustrates an exemplary user interface of multiple granularity location determination.

FIG. 5 illustrates an exemplary user interface for multiple granularity location determination. In FIG. 5, example map 502 of a geographic area is displayed on mobile device 500. Mobile device 500 can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Exemplary map 502 with a geographic area can be displayed on mobile device 500. Mobile device 500, when connected to a CDMA system, can acquire current CDMA identifiers. Mobile device 500 can retrieve a CDMA location corresponding to a current CDMA identifier by requesting from a server the CDMA location, or query a CDMA location database stored on a storage device on mobile device 500. In some implementations, mobile device 500 can display the map 502 on the touch sensitive display 530 of mobile device 500. The map 502 can be displayed when a user selects a maps object to view mapping and location based services. In some implementations, objects, such as the maps object, can be selected by voice activation. A search bar 504 and a bookmarks list object 506 can be displayed at the top of the map 502. Below the bottom of the map one or more display objects can be displayed, for example a search object 508, a directions object 510, a map view object 512, and a current location object 514.

The search bar 504 can be used to find an address or other location on the map. For example, a user can enter their home address in the search bar 504, and the region containing the address would be displayed on the map 502. The bookmarks list object 506 can, for example, bring up a Bookmarks list that contains addresses that are frequently visited, such as a user's home address. The Bookmarks list can also, for example, contain special bookmarks such as the current location (e.g. the current location of mobile device 500).

Search object 508 can be used to display search bar 504 and other map related search menus. The directions object 510 can, for example, bring up a menu interface that allows the user to enter a start and end location. The interface can then display information (e.g., directions and travel time for a route from the start location to the end location). Map view object 512 can bring up a menu that can allow the user to select display options for map 502. For example, map 502 can be changed from black and white to color, the background of the map can be changed, or the user can change the brightness of the map.

Current location object 514 can allow the user to see geographic area 516 on map 502 indicating where mobile device 500 is currently located. Geographic area 516 can correspond to a CDMA location that can be used as an estimate of the current location of mobile device 500. The CDMA location can have a center that is an average geographic location of data points. The CDMA location can have a radius that can be determined based on a distance between the average geographic location and one or more locations associated with a current CDMA identifier. The circle surrounding geographic area 516 can be replaced by another circle with smaller radius, when mobile device 500 can refine a granularity of a current location estimate. A special current location bookmark can be placed in the Bookmarks list when current location object 514 is selected. If the special current location bookmark was previously set in the Bookmarks list, the old bookmark information can, for example, be replaced with the new current location information. In some implementations, the special current location bookmark is tied to the centroid of geographic area 516. That is, the special current location bookmark can include the coordinates for the centroid of geographic area 516. Geographic area 516 can, for example, be depicted by a circle, rectangle, square, hexagon, or other enclosed region with crosshairs, or some other distinctive element to differentiate geographic area 516 from map 502.

In some implementations, geographic area 516 can indicate a region in which mobile device 500 is determined or estimated to be located, and the geographic area may not necessarily be centered on the actual current position of mobile device 500. In this example, mobile device 500 may be located off-center within the geographic area. In another example, geographic area 516 can be centered on an estimated current position of mobile device 500 (e.g., the center of the CDMA location).

Mobile device 500 can, for example, center the map view on geographic area 516 when the current location object 514 is tapped or otherwise selected. In some implementations, the zoom level of the map can be adjusted based on the accuracy or precision of the location data or the technology, system, or service that provided the location data. For example, the map can be zoomed out when mobile device 500 cannot receive GPS signals for lower accuracy and uses base station data to determine its location. The map can be zoomed in for higher accuracy if mobile device 500 is capable of using GPS location data to determine its current location. In some implementations, the zoom level can be based on the velocity of mobile device 500 (e.g., the map can be zoomed out at higher velocities and zoomed in when mobile device 500 is not moving). A combination of accuracy or precision and velocity can also be used.

If all methods for retrieving location-based data fail (e.g., when mobile device 500 is not within communication range of any base station or wireless access points), and there are no other systems or services available for determining or estimating the current position of mobile device 500, an error can be displayed to the user and no geographic area is displayed on map 502. The error can, for example, contain a message to the user informing them of the failure and the possible reason or reasons for the failure.

Current location object 514 can be selected, for example, to activate the estimating and displaying of geographic area 516 on map 502, to get directions to or from the estimated current location (i.e., the centroid of geographic area 516), to send the estimated current location of mobile device 500 to a friend (e.g., such that the friend can go to the same location), or to create a bookmark for the estimated current location.

Exemplary Network Architecture

Figure 6:
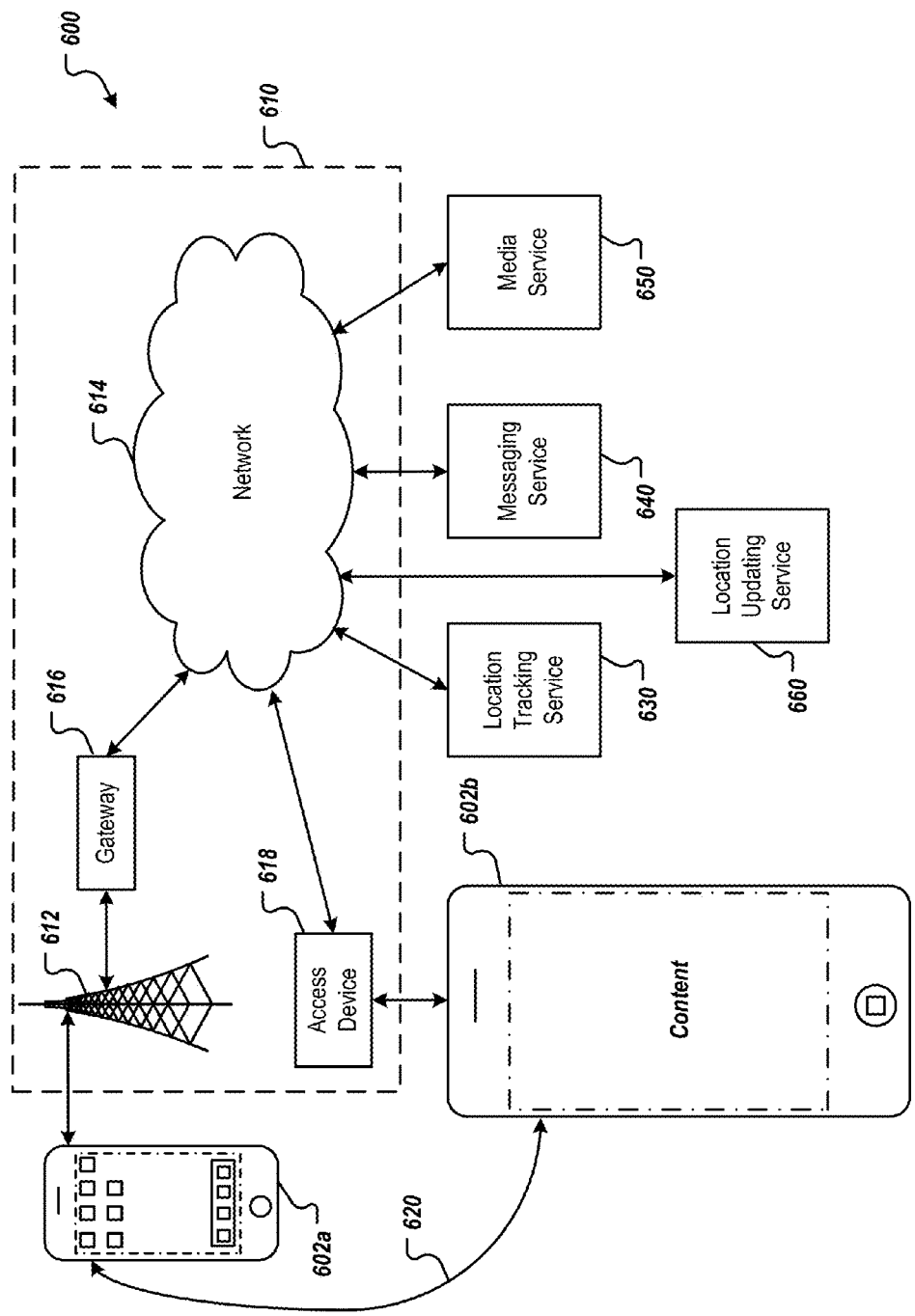
FIG. 6 is a block diagram illustrating an exemplary network architecture for implementing the features and operations described in reference to FIGS. 1-5.

FIG. 6 is a block diagram illustrating exemplary network architecture 600 for implementing the features and operations described in reference to FIGS. 1-5. Mobile devices 602*a* and 602*b* can, for example, communicate over one or more wired and/or wireless networks 610 in data communication. For example, a wireless network 612, e.g., a cellular network, can communicate with a wide area network (WAN) 614, such as the Internet, by use of a gateway 616. Likewise, an access device 618, such as an 802.11g wireless access device, can provide communication access to the wide area network 614.

In some implementations, both voice and data communications can be established over wireless network 612 and the access device 618. For example, mobile device 602*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 612, gateway 616, and wide area network 614 (e.g., using Transmission Control Protocol/Internet Protocol (TCP/IP) or User Datagram Protocol (UDP)). Likewise, in some implementations, the mobile device 602*b* can place and receive phone calls, send and receive e-mail messages, and retrieve electronic documents over the access device 618 and the wide area network 614. In some implementations, mobile device 602*a* or 602*b* can be physically connected to the access device 618 using one or more cables and the access device 618 can be a personal computer. In this configuration, mobile device 602*a* or 602*b* can be referred to as a "tethered" device.

Mobile devices 602*a* and 602*b* can also establish communications by other means. For example, mobile device 602*a* can communicate with other wireless devices, e.g., other mobile devices, cell phones, etc., over the wireless network 612. Likewise, mobile devices 602*a* and 602*b* can establish peer-to-peer communications 620, e.g., a personal area network, by use of one or more communication subsystems, such as the Bluetooth™ communication devices. Other communication protocols and topologies can also be implemented.

The mobile device 602*a* or 602*b* can, for example, communicate with one or more services 630, 640, 650, and 660 over the one or more wired and/or wireless networks. For example, one or more location tracking services 630 can calculate CDMA locations to be associated with each CDMA identifier and create a CDMA location database. The CDMA location database can be sent to mobile devices 602*a* and 602*b*. In some implementations, location tracking services 630 can also calculate locations to be associated with access points.

Messaging service 640 can, for example, provide e-mail and/or other messaging services (e.g., Short Message Service (SMS)). Messaging service 640 can allow a current user of a mobile device (e.g., mobile device 602*a*) to communicate with a requester who requests location information of mobile device 602*a*. Device security service 650 can, for example, provide functions for analyzing security events to determine security risk factor, sending security commands to mobile devices 602*a* and 602*b*, and processing security status information sent from mobile devices 602*a* and 602*b*.

Location updating service 660 can determine whether to send location information, including CDMA locations and locations of one or more access points, to mobile devices 602*a* and 602*b*. Upon determination that the information is to be sent (e.g., based on a request from mobile device 602*a* or 602*b*), location updating service 660 can transmit the information to mobile devices 602*a* and 602*b*.

Mobile device 602*a* or 602*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 602*a* or 602*b*. Such access can be provided by invocation of a web browsing function or application (e.g., a browser) in response to a user touching, for example, a Web object.

Exemplary Mobile Device Architecture

Figure 7:
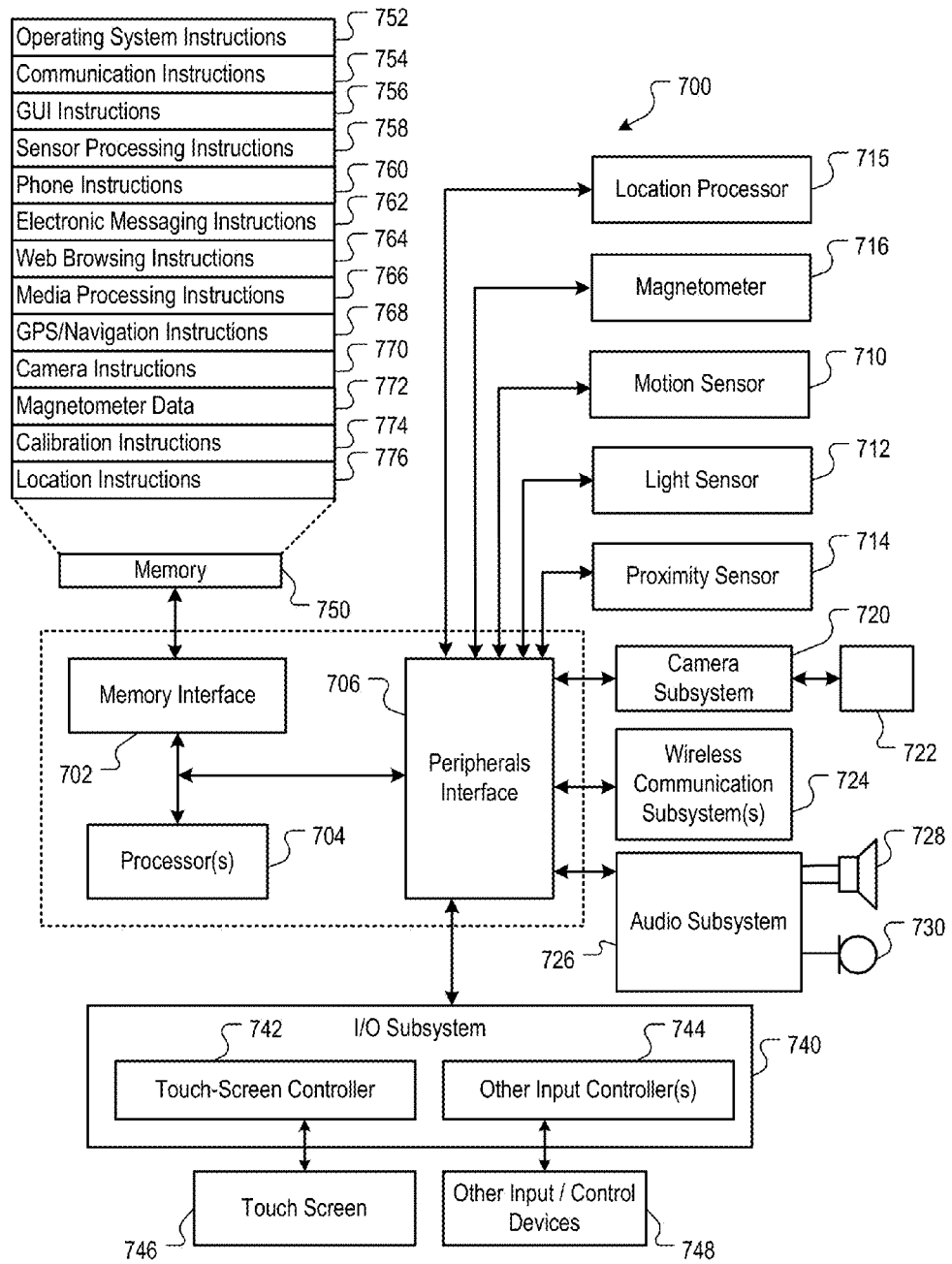
FIG. 7 is a block diagram illustrating an exemplary device architecture of a mobile device implementing the features and operations described in reference to FIGS. 1-5.

FIG. 7 is a block diagram of an exemplary architecture 700 for the mobile devices of FIGS. 1-6. A mobile device can include memory interface 702, one or more data processors, image processors and/or central processing units 704, and peripherals interface 706. Memory interface 702, one or more processors 704, and/or peripherals interface 706 can be separate components or can be integrated in one or more integrated circuits. The various components in the mobile device, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a GSM network, a GPRS network, an EDGE network, a WiFi™ or WiMax™ network, and a Bluetooth™ network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 400 on or off. The user may be able to customize a functionality of one or more of the buttons. The touch screen 746 can, for example, also be used to implement virtual or soft buttons and/or a keyboard.

In some implementations, mobile device 400 can present recorded audio and/or video files, such as MP3, AAC, and MPEG files. In some implementations, mobile device 400 can include the functionality of an MP3 player, such as an iPod™ Mobile device 400 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include location instructions 776 that can be used to transmit a current location to an access point, to determine an estimated current location based on location data associated with access points to which the mobile device is within a communication range, and to determine a current location using CDMA identifiers.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary System Architecture

Figure 8:
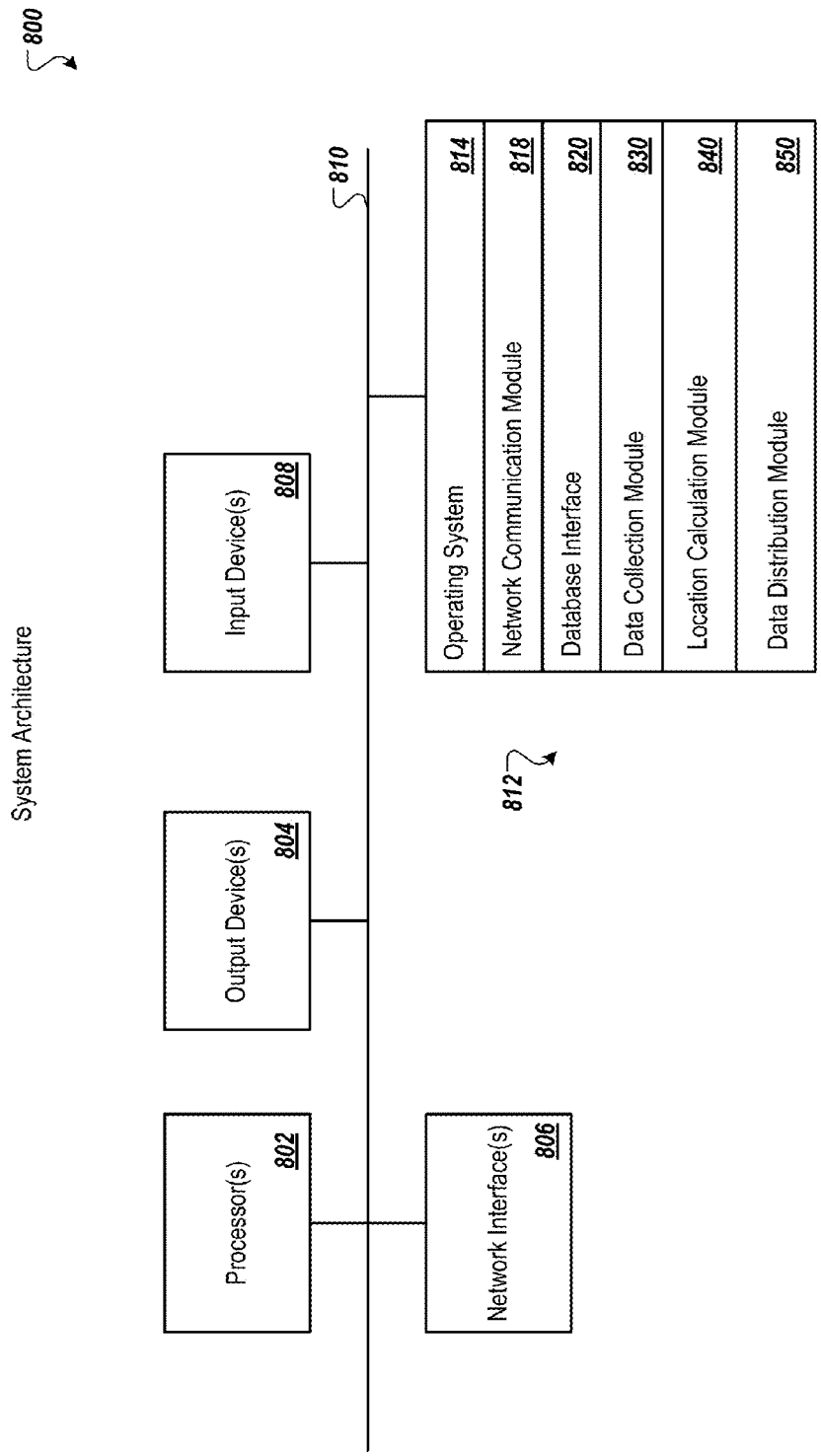
FIG. 8 is a block diagram of an exemplary system architecture for implementing the features and operations described in reference to FIGS. 1-5.

FIG. 8 is a block diagram of an exemplary system architecture 800 for implementing the features and operations described in reference to FIGS. 1-5. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to any medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 812 can further include operating system 814 (e.g., Mac OS® server, Windows® NT server), network communication module 818, database interface 820, data collection module 830, location calculation module 840, and data distribution module 850. Data collection module 830 can be configured to receive CDMA identifiers and location coordinates from mobile devices. Location calculation module 840 can be configured to determine a location to be associated with each CDMA identifier. Data distribution module 850 can be configured to distribute the CDMA identifiers and associated locations to mobile devices. Operating system 814 can be multi-user, multiprocessing, multitasking, multithreading, real time, etc. Operating system 814 performs basic tasks, including but not limited to: recognizing input from and providing output to devices 806, 808; keeping track and managing files and directories on computer-readable mediums 812 (e.g., memory or a storage device); controlling peripheral devices; and managing traffic on the one or more communication channels 810. Network communications module 816 includes various components for establishing and maintaining network connections (e.g., software for implementing communication protocols, such as TCP/IP, HTTP, etc.). Database interface 820 can include interfaces to one or more databases on a file system. The databases can be organized under a hierarchical folder structure, the folders mapping to directories in the file system. Data collection module 830 can include components for collecting data from multiple mobile devices. Location calculation module 840 can include one or more components (e.g., location engine 350) for performing calculations on locations received from mobile devices. Data distribution module 850 can perform various functions for transmitting location data in association with CDMA identifiers to various computing devices, including mobile devices.

Architecture 800 can be included in any device capable of hosting a database application program. Architecture 800 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, the location-aware devices are referred to as GPS-enabled. Location-aware mobile devices are not necessarily based on GPS technology. For example, mobile devices that can determine a location using triangulation are location-aware mobile devices and can be used in determining a CDMA location. Cells are represented as hexagons in the figures. The actual shape of a cell can vary. Locations are described as "circles." The term "circle" used in this specification can include any geometric shape (e.g., an ellipsis, a square, a convex or concave polygon, or a free-style shape) that is not perfectly circular but is closed or has an appearance of an enclosure. The radius of a geometric shape that is not perfectly circular can include an average distance between various points on the boundary of the geometric shape and a center of the geometric shape. Accordingly, other implementations are within the scope of the following claims.

What is claimed is:

1. A method executed by a mobile device, comprising:
   determining a first current location of the mobile device using a first current code division multiple access (CDMA) identifier, the first current CDMA identifier being associated with at least a portion of a CDMA system and corresponding to a first location, the first location having a first granularity; and
   in response to a request to determine a current location at a location granularity finer than the first granularity:
      determining a second current location of the mobile device using a second current CDMA identifier, the second current CDMA identifier corresponding to a second location, the second location having a second granularity that is finer than the first granularity, wherein the second current CDMA identifier is associated with a subset of the portion of the CDMA system; and
      providing the second current location for display on the mobile device,
   wherein:
      the first current CDMA identifier and the second current CDMA identifier are received from a same signal source;
      the first current CDMA identifier is different from the second current CDMA identifier; and
      each of the first current CDMA identifier and the second current CDMA identifier is one of a system identifier, a network identifier, a zone identifier, or a base station identifier, each of the system identifier, network identifier, zone identifier, and base station identifier being associated with a respective known or estimated location, each respective known or estimated location having a different level of granularity.

2. The method of claim 1, wherein determining the first current location comprises:
   receiving the first current CDMA identifier from the CDMA system;
   identifying a stored first CDMA identifier that matches the first current CDMA identifier, the stored first CDMA identifier being associated with the first location; and
   designating the first location associated with the matching first CDMA identifier as the first current location of the mobile device.

3. The method of claim 1, wherein determining the second current location comprises:
   receiving the second current CDMA identifier from the CDMA system;
   receiving, from a server, a set of one or more second CDMA identifiers, each received second CDMA identifier being associated with the second location;
   identifying a received second CDMA identifier that matches the second current CDMA identifier; and
   designating the second location associated with the matching second CDMA identifier as the second current location of the mobile device.

4. The method of claim 1, further comprising:
   before providing the second current location for display, providing the first current location for display on the mobile device.

5. The method of claim 4, wherein providing the second current location for display comprises:
   providing for display an animation effect, the animation effect zooming from the first current location to the second current location.

6. A computer program product tangibly stored on a storage device, operable to cause a mobile device to perform operations comprising:
   determining a first current location of the mobile device using a first current code division multiple access (CDMA) identifier, the first current CDMA identifier being associated with at least a portion of a CDMA system and corresponding to a first location, the first location having a first granularity; and
   in response to a request to determine a current location at a location granularity finer than the first granularity:
      determining a second current location of the mobile device using a second current CDMA identifier, the second current CDMA identifier corresponding to a second location, the second location having a second granularity that is finer than the first granularity, wherein the second current CDMA identifier is associated with a subset of the portion of the CDMA system; and
      providing the second current location for display on the mobile device,
   wherein:
      the first current CDMA identifier and the second current CDMA identifier are received from a same signal source;
      the first current CDMA identifier is different from the second current CDMA identifier; and
      each of the first current CDMA identifier and the second current CDMA identifier is one of a system identifier, a network identifier, a zone identifier, or a base station identifier, each of the system identifier, network identifier, zone identifier, and base station identifier being associated with a respective known or estimated location, each respective known or estimated location having a different level of granularity.

7. The product of claim 6, wherein determining the first current location comprises:
   receiving the first current CDMA identifier from the CDMA system;
   identifying a stored first CDMA identifier that matches the first current CDMA identifier, the stored first CDMA identifier being associated with the first location; and
   designating the first location associated with the matching first CDMA identifier as the first current location of the mobile device.

8. The product of claim 6, wherein determining the second current location comprises:
   receiving the second current CDMA identifier from the CDMA system;
   receiving, from a server, a set of one or more second CDMA identifiers, each received second CDMA identifier being associated with the second location;
   identifying a received second CDMA identifier that matches the second current CDMA identifier; and
   designating the second location associated with the matching second CDMA identifier as the second current location of the mobile device.

9. A mobile device, comprising:
   one or more processors configured to perform operations comprising:
      determining a first current location of the mobile device using a first current code division multiple access (CDMA) identifier, the first current CDMA identifier being associated with at least a portion of a CDMA system and corresponding to a first location, the first location having a first granularity; and in response to a request to determine a current location at a location granularity finer than the first granularity:

determining a second current location of the mobile device using a second current CDMA identifier, the second current CDMA identifier corresponding to a second location, the second location having a second granularity that is finer than the first granularity, wherein the second current CDMA identifier is associated with a subset of the portion of the CDMA system; and providing the second current location for display on the mobile device, wherein:

the first current CDMA identifier and the second current CDMA identifier are received from a same signal source;

the first current CDMA identifier is different from the second current CDMA identifier; and each of the first current CDMA identifier and the second current CDMA identifier is one of a system identifier, a network identifier, a zone identifier, or a base station identifier, each of the system identifier, network identifier, zone identifier, and base station identifier being associated with a respective known or estimated location, each respective known or estimated location having a different level of granularity.

10. The device of claim 9, wherein determining the first current location comprises:

receiving the first current CDMA identifier from the CDMA system;

identifying a stored first CDMA identifier that matches the first current CDMA identifier, the stored first CDMA identifier being associated with the first location; and designating the first location associated with the stored first CDMA identifier as the first current location of the mobile device.

11. The device of claim 10, wherein determining the second current location comprises:

receiving the second current CDMA identifier from the CDMA system;

requesting, from a server, a set of one or more second CDMA identifiers;

identifying a received second CDMA identifier that matches the second current CDMA identifier, the received second CDMA identifier being associated with the second location; and designating the second location associated with the received second CDMA identifier as the second current location of the mobile device.

12. A method executed by a computer, comprising:

receiving, from a set of first mobile devices:

a first code division multiple access (CDMA) identifier of a CDMA system and a second CDMA identifier of the CDMA system, the first CDMA identifier identifying at least a portion of the CDMA system, the second CDMA identifier identifying a subset of the portion of the CDMA system; and a set of geographic locations of the set of first mobile devices;

determining, based on the set of geographic locations, a first CDMA location for associating with the first CDMA identifier;

determining, based on the set of geographic locations, a second CDMA location for associating with the second CDMA identifier, the second CDMA location being inside the first CDMA location; and providing, in a tiered manner, the first CDMA location and the second CDMA location to a second mobile device for estimating a geographic location of the second mobile device using the first CDMA identifier and the second CDMA identifier.

13. The method of claim 12, wherein the first CDMA identifier and second CDMA identifier each comprises at least one of a system identifier, a network identifier, a zone identifier, or a base station identifier.

14. The method of claim 12, wherein providing the first CDMA location and the second CDMA location to the second mobile device comprises:

providing the first CDMA location to the second mobile device in association with the first CDMA identifier;

receiving a request from the second mobile device requesting second CDMA identifiers associated with the first CDMA identifier; and then providing the second CDMA location to the second mobile device in association with the second CDMA identifier.

15. The method of claim 12, wherein the first CDMA location and second CDMA location each comprises geographic coordinates and an indicator of a granularity.

16. A computer program product tangibly stored on a storage device, operable to cause data processing apparatus to perform operations comprising:

receiving, from a set of first mobile devices:

a first code division multiple access (CDMA) identifier of a CDMA system and a second CDMA identifier of the CDMA system, the first CDMA identifier identifying at least a portion of the CDMA system, the second CDMA identifier identifying a subset of the portion of the CDMA system; and a set of geographic locations of the set of first mobile devices;

determining, based on the set of geographic locations, a first CDMA location for associating with the first CDMA identifier;

determining, based on the set of geographic locations, a second CDMA location for associating with the second CDMA identifier, the second CDMA location being inside the first CDMA location; and providing, in a tiered manner, the first CDMA location and the second CDMA location to a second mobile device for estimating a geographic location of the second mobile device using the first CDMA identifier and the second CDMA identifier.

17. The product of claim 16, wherein the first CDMA identifier and second CDMA identifier each comprises at least one of a system identifier, a network identifier, a zone identifier, or a base station identifier.

18. The product of claim 16, wherein providing the first CDMA location and the second CDMA location to the second mobile device comprises:

providing the first CDMA location to the second mobile device in association with the first CDMA identifier;

receiving a request from the second mobile device requesting second CDMA identifiers associated with the first CDMA identifier; and then providing the second CDMA location to the second mobile device in association with the second CDMA identifier.

19. The product of claim 16, wherein the first CDMA location and second CDMA location each comprises geographic coordinates and an indicator of a granularity.

20. A method executed by a mobile device, comprising:
determining that a first current code division multiple access (CDMA) identifier matches a stored first CDMA identifier, the stored first CDMA identifier corresponding to at least a portion of a CDMA system and being associated with a first location;
receiving one or more second CDMA identifiers, each second CDMA identifier being associated with a second location and corresponding to a subset of the portion of the CDMA system;
determining that a second current CDMA identifier matches a received second CDMA identifier; and
designating the second location associated with the matching received second CDMA identifier as a current location of the mobile device,
wherein:
the first current CDMA identifier and the second current CDMA identifier are received from a same signal source;
the first current CDMA identifier is different from the second current CDMA identifier; and
each of the first current CDMA identifier and the second current CDMA identifier is one of a system identifier, a network identifier, a zone identifier, or a base station identifier, each of the system identifier, network identifier, zone identifier, and base station identifier being associated with a respective known or estimated location, each respective known or estimated location having a different level of granularity.

21. The method of claim 20, further comprising:
detecting a change of the first current CDMA identifier; and
upon detecting the change, requesting the one or more second CDMA identifiers.

22. The method of claim 20, further comprising:
designating the first location as the current location of the mobile device before determining that the second current CDMA identifier matches a received second CDMA identifier.

23. The method of claim 20, further comprising:
providing a first indicator for display on the mobile device, the first indicator indicating the first location; and
upon determining that the second current CDMA identifier matches the received second CDMA identifier, providing a second indicator for display on the mobile device, the second indicator indicating the second location.

24. A system, comprising:
one or more processors; and
a non-transitory computer-readable medium storing instructions operable to cause the one or more processors to perform operations comprising:
receiving, from a set of first mobile devices:
a first code division multiple access (CDMA) identifier of a CDMA system and a second CDMA identifier of the CDMA system, the first CDMA identifier identifying at least a portion of the CDMA system, the second CDMA identifier identifying a subset of the portion of the CDMA system; and
a set of geographic locations of the set of first mobile devices;
determining, based on the set of geographic locations, a first CDMA location for associating with the first CDMA identifier;
determining, based on the set of geographic locations, a second CDMA location for associating with the second CDMA identifier, the second CDMA location being inside the first CDMA location; and
providing, in a tiered manner, the first CDMA location and the second CDMA location to a second mobile device for estimating a geographic location of the second mobile device using the first CDMA identifier and the second CDMA identifier.

25. The system of claim 24, wherein the first CDMA identifier and second CDMA identifier each comprises at least one of a system identifier, a network identifier, a zone identifier, or a base station identifier.

26. The system of claim 24, wherein providing the first CDMA location and the second CDMA location to the second mobile device comprises:
providing the first CDMA location to the second mobile device in association with the first CDMA identifier;
receiving a request from the second mobile device requesting second CDMA identifiers associated with the first CDMA identifier; and then
providing the second CDMA location to the second mobile device in association with the second CDMA identifier.

27. The system of claim 24, wherein the first CDMA location and second CDMA location each comprises geographic coordinates and an indicator of a granularity.

* * * * *